United States Patent [19]

Richards

[11] Patent Number: 5,064,025

[45] Date of Patent: Nov. 12, 1991

[54] GEAR LUBRICATION

[75] Inventor: Martyn Richards, Burton, England

[73] Assignee: Rolls-Royce, plc, London, England

[21] Appl. No.: 587,101

[22] Filed: Sep. 24, 1990

[30] Foreign Application Priority Data

Oct. 18, 1989 [GB] United Kingdom ............ 8923517

[51] Int. Cl.[5] ............................................. F16H 57/04
[52] U.S. Cl. ...................... 184/6.12; 184/11.1; 74/468
[58] Field of Search ............ 184/6.12, 11.1, 31; 74/467, 468

[56] References Cited

U.S. PATENT DOCUMENTS

| 1,186,434 | 6/1916 | Pierce | 74/468 |
| 3,508,630 | 4/1970 | Keller et al. | 74/467 |
| 4,327,598 | 5/1982 | Yoneda et al. | 184/11.1 |
| 4,848,177 | 7/1989 | Miura et al. | 184/6.12 |

FOREIGN PATENT DOCUMENTS 0896079  1/1947  France .................... 74/468
989898   4/1965  United Kingdom .

Primary Examiner—Ira S. Lazarus
Assistant Examiner—Alan B. Cariaso
Attorney, Agent, or Firm—Oliff & Berridge

[57] ABSTRACT

In an accessory drive unit e.g. as used in a gas turbine engine, some of the gears in a gear train are provided with pockets 20 in which drainage oil is collected on engine shut down. On re-starting of the engine, the collected oil is acted upon by ribs 16 and is flung onto the teeth of the gears so as to provide immediate lubrication, rather than experience a delay until main lubricant supply pressure is increased. Friction and wear on start up is reduced.

3 Claims, 1 Drawing Sheet

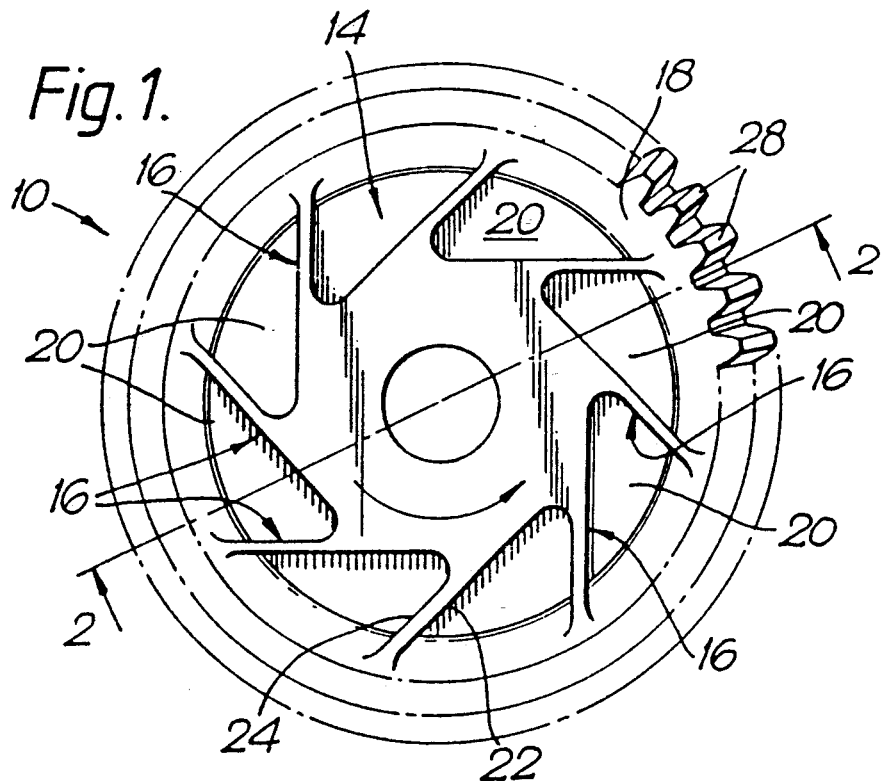
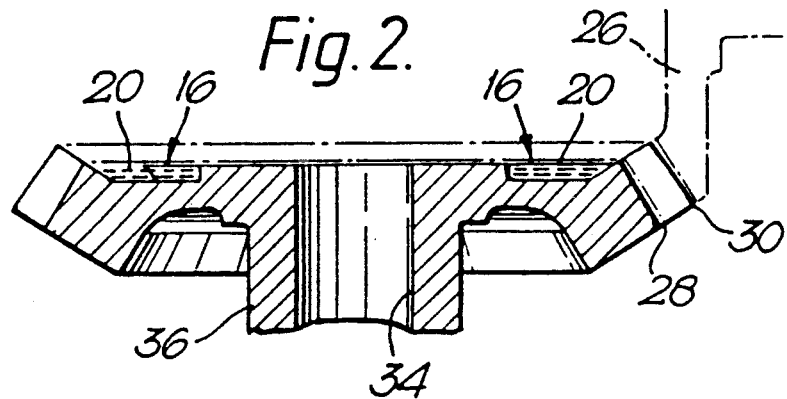
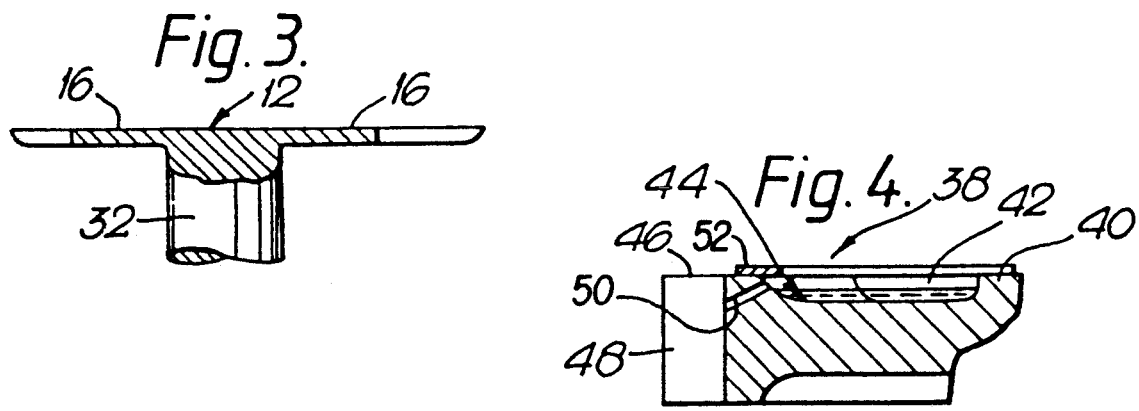

GEAR LUBRICATION

This invention relates to the lubrication of gear teeth.

The teeth of high speed gear wheels suffer excessive wear on start up. The wear occurs because lubricant is not immediately available to the teeth, with the result that friction is generated.

Where space is available and weight is not a criteria, some of the gears in a gear train stand in a lubricant sump. Many road vehicles are so provided. Where however, weight and space are vital criteria, as for example in the gas turbine engine field, then a sump, whilst having some efficacy, creates other problems, primarily with regard to need for space and weight.

The present invention seeks to provide an improved gear lubrication system.

According to the present invention a gear lubrication system comprises lubricant reservoir means defined in part by a face of at least one gear wheel which in rotating operation meshes with one or more other gear wheels, and in part by ribs which extend from a boss positioned centrally of said at least one gear wheel, across said face to define with said face pockets in which lubricant collects on cessation of operational rotation of said meshing gears and wherein said ribs extend in directions which on rotation of said at least one gear wheel, ensures that a moving force is exerted thereby on lubricant in said pockets, in the plane of said face and in a direction away from the axis of rotation, said boss and associated ribs being removably fixed to said at least one gear wheel for operation therewith.

The invention will now be described by way of example and with reference to the accompanying drawings in which:

FIG. 1 is a view on the face of a gear wheel which incorporates an embodiment of the present invention.

FIG. 2 is a view on line 2—2 of FIG. 1.

FIG. 3 and 4 each depict a further embodiment of the present invention.

Referring to FIG. 1. A bevel gear wheel 10 has a centrally positioned raised boss 12 on its face 14. The boss 12 has a number of ribs 16 extending from its periphery which, in combination with the frusto conical wall 18 in which the gear teeth are formed, define the bounds of individual pockets 20.

The ribs 16 are arranged tangentially of the boss 12, and this results in one side 22 of each respective rib 16 being larger than the other side 24 thereof. The arrangement is such that the long sides 22 are the leading sides during rotation of the gear wheel 10.

On shut down of an engine (not shown) in which the gear wheel 10 of the present invention is utilised, lubricant will dribble into the pockets 20 from surrounding gears e.g. gear 26 in FIG. 2, which also depicts lubricant in the pockets 20.

When the engine (not shown) starts up again, the gear wheel 10 will rotate and the sides 22 of the ribs 16 will exert an immediate, positive force on the lubricant in the pockets 20, in directions which have a large radially outward component, with respect to the axis of rotation of the gear wheel 10. The lubricant is thus urged towards and into the teeth 28 of the gear wheel 10 and the meshing teeth 30 of the gear wheel 26 (FIG. 2).

Referring now to FIG. 3. If it is desired to maintain machining complexity at a minimum, the boss 12 and its associated ribs 16 may be produced separately. The boss when so made is provided with a stem 32 which will be dimensioned so as to fit in a bore 34 in the shaft 36 of the gear wheel 10 (FIG. 2). The ribs 16 will engage the face 14 (FIG. 1) of the gear wheel 10 and the boss 12 can be retained by e.g. a through bolt (not shown) or rivets or screws (not shown) which would pass through the boss 12 into the face 14 of the gear wheel 10.

Referring now to FIG. 4. A spur gear wheel 38 is provided with a boss 40 and associated ribs 42 which are identical with the boss 12 and the ribs 16 of FIG. 1 and which also define pockets 44 for the retention of lubricant therein.

The ends 46 of the spur teeth 48 do not form a continuous surface with the floors of the pockets 44 and without suitable steps being taken, rotation of the spur gear 38 would result in lubricant being thrown clear of the teeth 48. To counteract this, passages 50 are provided in the rim of the gear to allow communication between the pockets 44 and the teeth 48 and further, an annular cowl 52 is affixed to the gear rim and is proportioned so as to overlap the pockets 44. Lubricant is thus forced into the passages 50 when the spur gear wheel 38 rotates on start up of the engine (not shown) with which it is associated.

The boss 40 with its associated ribs 42 can be manufactured separately as is described with reference to FIG. 3 and can be fitted to and retained on the spur gear wheel 38 in any manner appropriate to the needs of the assembly.

The skilled man, having read this specification, will perceive that the attitudes of the rib 16 with respect to each other can be varied, which will vary the efficiency of the drive effect of the leading side thereof. What he will also perceive, is that the tip of each rib must never lead its root, for this would result in an inwardly directed driving force being exerted on the lubricant.

The actual angular relationship of the ribs 16 and of course, the rib 42 may be determined by experiment having regard to the viscosity of the lubricant and the rapidity with which the gear wheels accelerate.

I claim:

1. A gear lubrication system comprising lubricant reservoir means defined in part by a face of at least one gear wheel which in rotating operation meshes with one or more other gear wheels, and in part by ribs which extend from a boss positioned centrally of said at least one gear wheel, across said face to define with said face, pockets in which lubricant collects on cessation of operational rotation of said meshing gears, said boss having a cylindrical stem and the associated gear wheel having a bore which receives said stem in fixed positioned relationship, and wherein said ribs extend in directions which on rotation of said at least one gear wheel, ensures that a moving force is exerted thereby on lubricant in said pockets, in the plane of said face and in a direction away from the axis of rotation, said boss and associated ribs being removable fixed to said at least one gear wheel for operation therewith.

2. A gear lubrication system as claimed in claim 1 wherein at least one gear wheel is a spur gear wheel.

3. A gear lubrication system as claimed in claim 2 wherein the spur gear wheel is provided with an annular cowl which overlaps the radially outer ends of said pockets and passages which enable fluid communication between said pockets and the teeth of said spur gear wheel, wherein during rotation of said spur gear wheel, lubricant is constrained by said overlapping portion of said cowl, to flow through said passages.

* * * * *